Aug. 13, 1935.  E. LEITZ, JR  2,011,002
CONCENTRICALLY ADJUSTABLE OBJECTIVE DIAPHRAGM
Filed July 16, 1934
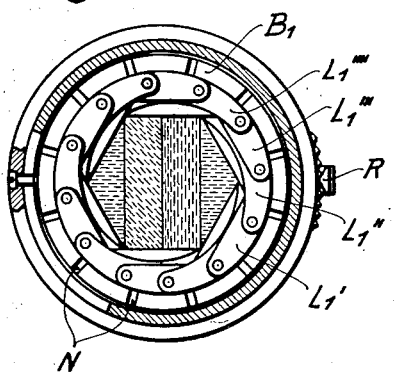
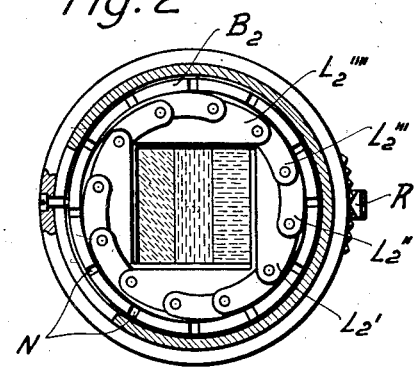
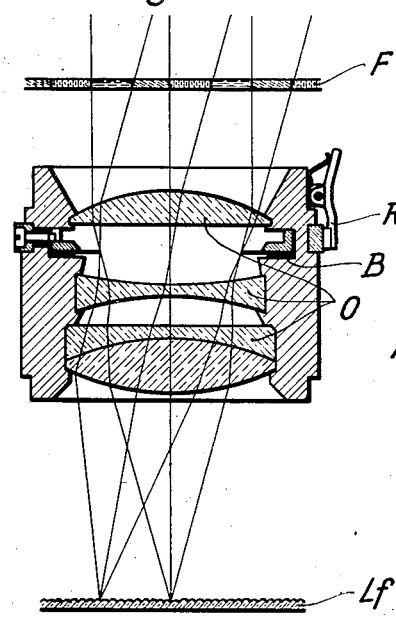
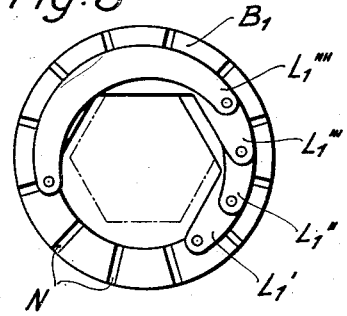
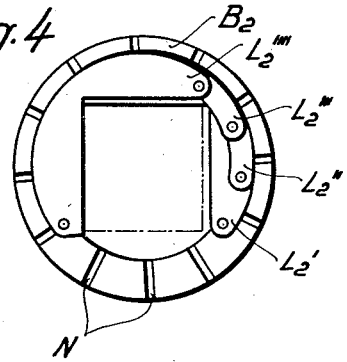
INVENTOR
Ernst Leitz, Jr.
BY
ATTORNEY Patented Aug. 13, 1935

2,011,002

UNITED STATES PATENT OFFICE 2,011,002

CONCENTRICALLY ADJUSTABLE OBJECTIVE DIAPHRAGM

Ernst Leitz, Jr., Wetzlar, Germany, assignor to Ernst Leitz, Optische Werke, G. m. b. H., Wetzlar, Germany Application July 16, 1934, Serial No. 735,330
In Germany July 17, 1933

1 Claim. (Cl. 95—81.5)

This invention relates to an objective Iris-diaphragm for use with stripe filters for lens screen films, particularly to an Iris-diaphragm arranged in a photographic objective and having multi-corner, particularly hexagonal form with straight inner edges equipped with a mark or catch at the point where the diaphragm assumes a position most favorable for the taking of colored pictures by means of multi-striped filter and lens screen films.

Stationary diaphragms of square or hexagonal form for the taking of pictures with lens screen films or multi-stripe filters are known, they are in most cases arranged immediately in front of the objective. The most favorable position of such a diaphragm is within the diaphragm plane free of vignetting.

This space however is usually taken up by the Iris-diaphragm necessary for the taking of black and white pictures.

Moreover an insertable diaphragm would be accompanied by the disadvantage of impairing the dust-proof arrangement of the objective. It appears therefore to be of great advantage to enable the use of the Iris-diaphragm of the objective simultaneously also for the taking of colored pictures, and this is the principal object of my invention according to which I provide an Iris-diaphragm of multi-cornered, particularly hexagonal form with straight inner edges.

With the use of such diaphragm it is immaterial whether the diaphragm is located in a level plane or on a spherical plane.

For the most effective darkening of equal colored parts in the multi-stripe filter the diaphragm must be located within a predetermined position with respect to the filter stripes, and therefore I have provided on the adjustment ring for the diaphragm at this place a mark or a catch to positively indicate the correct position of the diaphragm.

These and other objectives and advantages of my invention will become more fully known as the description thereof proceeds and will then be more specifically defined in the appended claim.

In the accompanying drawing forming a material part of this disclosure:

Fig. 1 illustrates a hexagonal Iris-diaphragm constructed according to my invention.

Fig. 2 shows a square form of Iris-diaphragm.

Fig. 3 illustrates the arrangement of the lamellæ with a hexagonal Iris-diaphragm.

Fig. 4 shows the arrangement of such lamellæ with the square form of Iris-diaphragm.

Fig. 5 is a sectional elevation of an objective illustrating a diaphragm and arranged.

As illustrated, the diaphragm B, $B_1$, $B_2$ are formed in the well known manner by lamellæ, having one of their ends rotatably and the other end slidably arranged in grooves N. The multi-cornered form of square-shaped diaphragm is achieved, if for instance twelve lamellæ $L_1$, $L_2$ . . . are used the inner edge of each third lamella $L_2'$, $L_2''''$ . . . or, if a hexagonal diaphragm is employed, each second lamella $L_1'$, $L_1'''$ . . . form two sides of the square or hexagonal diaphragm. The lamellæ interposed between these lamellæ $L_2''$, $L_2'''$ . . . or $L_1''$, $L_2''''$ . . . have arcuate inner edges and serve as cover for the gaps formed during the closing of the diaphragm shutter between the individual lamellæ. However, if the lamellæ have a sufficient width or breadth of a suitable angular shape, it will be possible to dispense with the use of such arcuate intermediate lamellæ.

The objectives O for colored photography by means of striped filters F and lens screen film $Lf$ are focused in alignment. Therefore the multi-cornered diaphragm B can be so arranged that it assumes a most favorable position for the taking of color pictures, i. e. a position in which the diaphragm selects such equal color parts from the striped filter F as are most favorable in all directions, as can be seen or established in Figures 1, 2, and 5 by means of a catch R which may be set to a certain of the marks illustrated in said figures.

If in an objective the most favorable position for coma rays should be different from that position free of vignetting, it is advisable to arrange two diaphragms, a regular round one for the black-white pictures and a multi-colored one for color pictures, both in the most correct position.

Besides its level position illustrated in Figure 5 the diaphragm may also be arranged so as to move along or across a spherical face for assuming the most favorable location free of vignetting.

The use of a multi-cornered diaphragm as Iris-diaphragm in the perspective plane free of vignetting has the advantage that the multi-striped filter can be arranged at any desired or suitable place in front or behind the objective.

The operation and use of my invention will be entirely clear from the above description by simultaneous reference to the drawing.

It will be understood that I have described and shown the preferred form of my invention only as one example of the many possible ways to practically construct the same, and that I may make such changes as come within the scope of the appended claim without departure from the spirit of my invention and the principles involved.

Having thus described my invention, what I claim as new and desire to secure by Letters Patent is:

In a concentrically adjustable objective diaphragm a plurality of lamellæ, each second of which has a straight inner edge, the others having arcuate form, said arcuate lamellæ interposed between the straight edged lamellæ to serve as cover for the gaps formed between the individual lamellæ during the closing of the diaphragm shutter for effectively darkening equal colored parts of the multi-striped filter for color photography.

ERNST LEITZ, Jr.